US008064969B2

(12) United States Patent
Diethorn et al.

(10) Patent No.: US 8,064,969 B2
(45) Date of Patent: Nov. 22, 2011

(54) METHOD AND APPARATUS FOR COMBINED WIRED/WIRELESS POP-OUT SPEAKERPHONE MICROPHONE

(75) Inventors: Eric J. Diethorn, Long Valley, NJ (US); Gary W. Elko, Summit, NJ (US); Biing-Hwang Juang, Warren Township, NJ (US); James E. West, Plainfield, NJ (US)

(73) Assignee: Avaya Inc., Basking Ridge, NJ (US)

( * ) Notice: Subject to any disclaimer, the term of this patent is extended or adjusted under 35 U.S.C. 154(b) by 671 days.

(21) Appl. No.: 10/641,449

(22) Filed: Aug. 15, 2003

(65) Prior Publication Data
US 2005/0037782 A1    Feb. 17, 2005

(51) Int. Cl.
*H04M 1/00* (2006.01)
(52) U.S. Cl. .................. 455/575.1; 455/569.1; 455/570; 455/550.1; 455/416; 455/465; 455/462
(58) Field of Classification Search ............... 455/569.1, 455/570, 550.1, 462, 416, 465; 379/61, 62
See application file for complete search history.

(56) References Cited

U.S. PATENT DOCUMENTS

| | | | |
|---|---|---|---|
| 5,578,875 A * | 11/1996 | Dormer et al. ................ 307/66 |
| 5,748,707 A * | 5/1998 | Sanserino ..................... 455/570 |
| 5,832,390 A | 11/1998 | Irvin |
| 6,321,080 B1 * | 11/2001 | Diethorn ...................... 455/416 |
| 6,768,914 B1 * | 7/2004 | Garey ......................... 455/569.1 |
| 6,892,051 B2 * | 5/2005 | Schmitt et al. ............... 455/41.2 |
| 2003/0096603 A1 * | 5/2003 | Chen ............................ 455/416 |
| 2005/0037823 A1 * | 2/2005 | Seshadri et al. ........... 455/575.6 |

* cited by examiner

*Primary Examiner* — Charles Appiah
*Assistant Examiner* — Randy Peaches
(74) *Attorney, Agent, or Firm* — Muncy, Geissler, Olds & Lowe, PLLC

(57) ABSTRACT

The present invention is a desktop speakerphone having a base-station and a detachable microphone pod. The base-station includes standard telephone components, as well as a wireless receiver and a housing for a detachable microphone pod. The detachable pod contains at least one microphone and a wireless transmitter. When the pod is attached to the base-station, and the conference mode of operation is activated, the pod microphone's audio signal goes directly to base-station audio circuitry via a wired connection. When the pod is detached and the conference mode activated, the pod microphone's audio signal now goes via the pod's wireless transmitter to the base-station's wireless receiver. This detached, wireless mode allows the microphone to be positioned anywhere in the room, thereby improving the quality of transmitted speech by increasing the speech-signal-to-room-noise ratio, and lessening the potential for room echo by reducing the acoustic coupling between base-station loudspeaker and pod microphone.

24 Claims, 2 Drawing Sheets

METHOD AND APPARATUS FOR COMBINED WIRED/WIRELESS POP-OUT SPEAKERPHONE MICROPHONE

FIELD OF THE INVENTION

The present invention relates to microphones for desktop speakerphones and more particularly to methods and apparatus for combined wired/wireless pop-out microphones for speakerphones.

BACKGROUND OF THE INVENTION

Desktop speakerphones are well-known devices that allow groups of people to simultaneously converse in a conference mode using a single telephone and telephone connection. Desktop speakerphones also allow individual users to conduct hands-free conversations.

Traditional speakerphones have one or more built-in, fixed microphones. When used in a conference call mode, such speakerphones experience large differences in the distance between the microphone and talkers within the room. As a result, the level of a distant talker's voice at the microphone can fall low enough that the speech processing algorithms used in the speakerphone to suppress or eliminate echo can cause significant distortion to the speech or may even eliminate it entirely.

Traditional speakerphones also have a distinctive "speakerphone sound", sometimes referred to as "barrel sound" imposed on the near talker's voice if there is a large distance between the near talker's mouth and the microphone. This results from the talker's voice reaching the microphone both by a direct, line-of-sight path also via multiple reflected paths resulting from the room's walls and contents. The further the talker is from the microphone, the larger the contribution from the reflected paths and the greater the reverberation or "barrel sound".

Additionally, the far party may hear echoes of their voice if the speakerphone is not perfect and fails to suppress or cancel the echo. This echo is more prevalent in speakerphones that attempt to provide full-duplex communications. This also means that even an individual user of such a speakerphone, conducting a hands-free conversation, must avoid excessive motion when near to the microphone. Echo suppression or cancellation is easier when the acoustic coupling between the microphone and the loudspeaker is low. In traditional speakerphones the microphone and loudspeaker are close together, resulting in relatively high acoustic coupling between them and making the echo suppression or canceling more difficult.

These shortcomings of traditional speakerphones can be very distracting to the party or parties on the far end of the telephone conversation.

Prior art attempts to solve these problems, such as U.S. Pat. No. 5,748,707 to Sanserino entitled "Speakerphone with remote microphone having speaker cut-off for half duplex operation", U.S. Pat. No. 5,832,390 to Irvin entitled "Untethered microphone and base unit" and U.S. Pat. No. 6,321,080 to Diethorn entitled "Conference telephone utilizing base and handset transducers", all of which are hereby incorporated by reference, do not provide for the remote microphone to additionally be attached in a wired mode which is more secure against electronic eavesdropping.

There is a need for a telephone that can switch between operating as a conventional, secure speakerphone to operating in a speakerphone mode that facilitates conference calls but avoids the shortcomings of traditional speakerphones described above, including the so called "barrel sound" and unwanted echoing.

SUMMARY OF THE INVENTION

The present invention is directed towards a desktop speakerphone telephone system and apparatus that can operate both in a conventional, wired and secure mode as well as in a mode that significantly reduces the so called "barrel sound" and unwanted echo associated with traditional speakerphones by including a combined wired/wireless pop-out microphone pod. Having a pop-out microphone pod means that the near talker may always be close to the microphone, thereby reducing the reverberation or "barrel sound" caused by the talkers voice reaching the microphone via multi-path reflections off room walls and contents. The pop-out microphone also means that the microphone-to-loudspeaker distance is usually increased, thereby decreasing acoustic coupling between them and making far-talker echo suppression or cancellation easier and more effective.

In the preferred embodiment, the desktop speakerphone telephone of the present invention includes a base station and a detachable microphone pod.

The base station has standard telephone components, including a telephone network interface, a handset with mouthpiece microphone and earpiece loudspeaker, a dialing pad, a base station loudspeaker, an auditory circuit, a control circuit and appropriate connections to a telephone network. In addition, the base station includes a short-range wireless receiver and a housing for a detachable microphone pod.

The detachable microphone pod contains at least one microphone, an auditory circuit, a control unit, a wireless transmitter and a rechargeable battery.

When the microphone pod is attached to the speakerphone base station, and the loudspeaker or conference mode of operation is activated, the pod microphone's audio signal is sent directly to the base station audio circuitry by means of a wired or traditional connection.

When the microphone pod is detached from the speakerphone base station, the pod microphone's audio signal is sent via the short-range wireless transmitter in the pod to the wireless receiver in the base station and on to the base station auditory circuit.

This wireless mode of speakerphone operation allows the microphone to be positioned anywhere in the room, thereby improving the voice quality of transmitted speech by increasing the speech-signal-to-room-noise ratio, and lessening the potential for echo by reducing the acoustic coupling between the loudspeaker and microphone.

When in position in the base telephone, a very secure line may be created by the direct connection.

When in position in the base telephone, the microphone pod's rechargeable battery may be recharged.

When the microphone pod is operating in the wireless mode, there may additionally be information transmitted from the speakerphone base station that is received by a wireless receiver in the microphone pod, and vice-versa. This base-to-pod transmission may be for purposes such as, but not limited to, issuing command and control instructions or synchronizing the operation of multiple microphone pods.

The microphone pod may include additional functional features such as, but not limited to, stands for easy positioning on a flat surface, clips for easy attachment to user's clothing and devices for easy attachment to walls or windows.

An advantage of the pop-out wireless microphone of the present invention is its ability to be placed nearly anywhere within a room. In particular, when two or more people are using a single speakerphone, the wireless microphone can be placed at the center of the group. By having the microphone close to one or more speaking people, the voice quality of transmitted speech is improved in two ways. First, because the microphone is closer to any single talker's mouth, the speech-signal-to-room-noise ratio is increased. Second, and again because the microphone is closer to any talker's mouth, the speech signal arriving at the microphone is less reverberant, i.e. less 'hollow' or 'barrel' sounding.

DETAILED DESCRIPTION

During the course of this description like numbers will be used to identify like elements according to the different figures that illustrate the invention.

Figure 1:
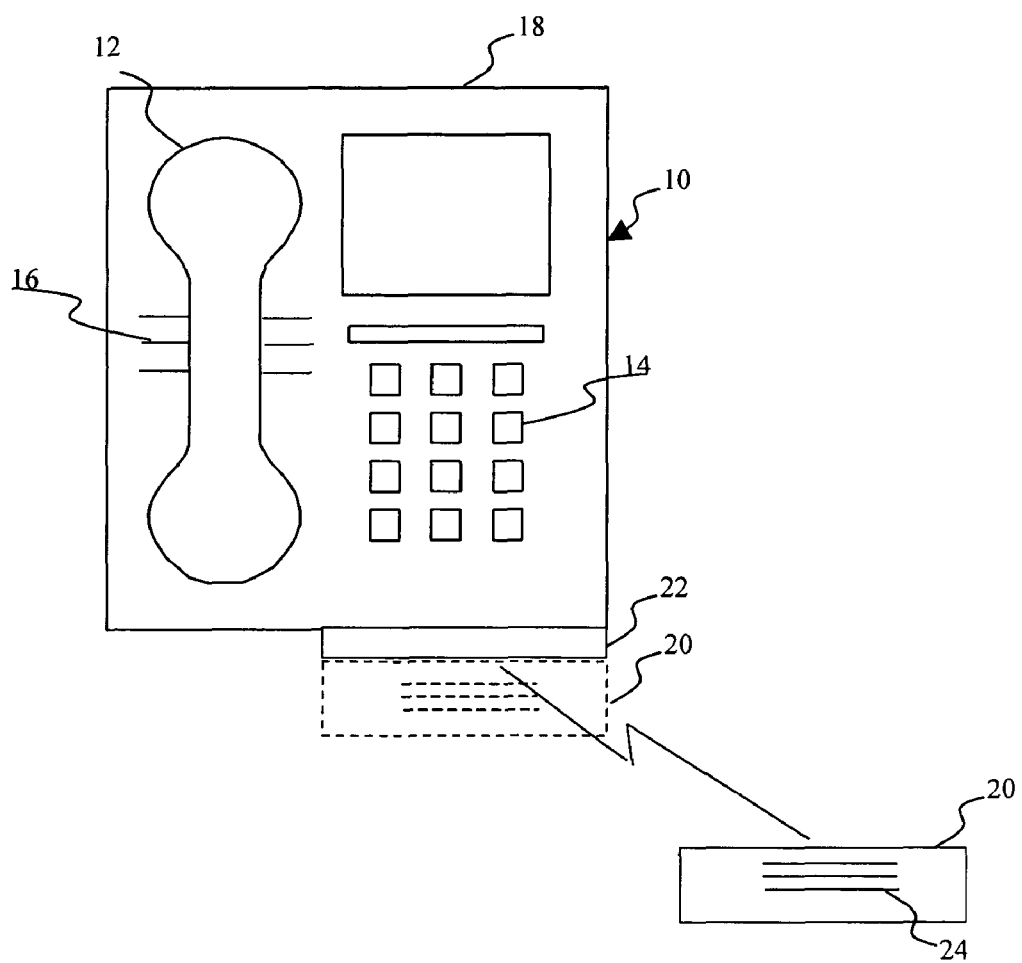
FIG. 1 is schematic view of a speakerphone with a removable microphone pod.

FIG. 1 is a schematic view of a speakerphone 10 having the features of a conventional speakerphone including, but not limited to, a removable handset 12, which may be a wireless handset or a handset connected to the speakerphone base-station by a suitable cord, a keypad 14 for dialing numbers and entering instructions and a loudspeaker 16, incorporated into the speakerphone base-station 18 for possible use when handset 12 is on the hook. In addition, the speakerphone of the preferred embodiment has a removable microphone pod 20. In a wired mode of operation, the removable microphone pod 20 is attached to the base station 18 by a suitable cradle, docking station or holder 22. In FIG. 1, this wired position of the removable microphone pod 20 is shown dotted. In this attached setup, the speakerphone 10 operates much like a convention speakerphone. With handset 12 in its holding cradle, a function button on keypad 14 activates the loudspeaker or conference mode, causing any incoming conversation to be broadcast over loudspeaker 16 rather than being played over the handset 12's earpiece loudspeaker. This allows anyone in the vicinity of the speakerphone to hear the far talker's contribution to the conversation. The far talker will be used in this description to mean the person or persons not in the room with the speakerphone, who is participating in the telephone conversation via the telephone network. The near talker will be used to describe the person or persons in the same room as the speakerphone. The outgoing contribution to the conversation by any of the near talkers is picked up by microphone 24 in the microphone pod 20, rather than by the handset 12's mouthpiece microphone.

In the preferred mode of the present invention, microphone pod 20 can be detached from the speakerphone base and moved to a remote location, as shown by the solid line form of microphone pod 20 in FIG. 1. When pod 20 is detached from holder 22, a wireless link is activated between the microphone pod 20 and the base station 18. In this wireless mode of operation, pod 20 may be placed at any suitable position and function as the microphone for speakerphone 10.

Figure 2:
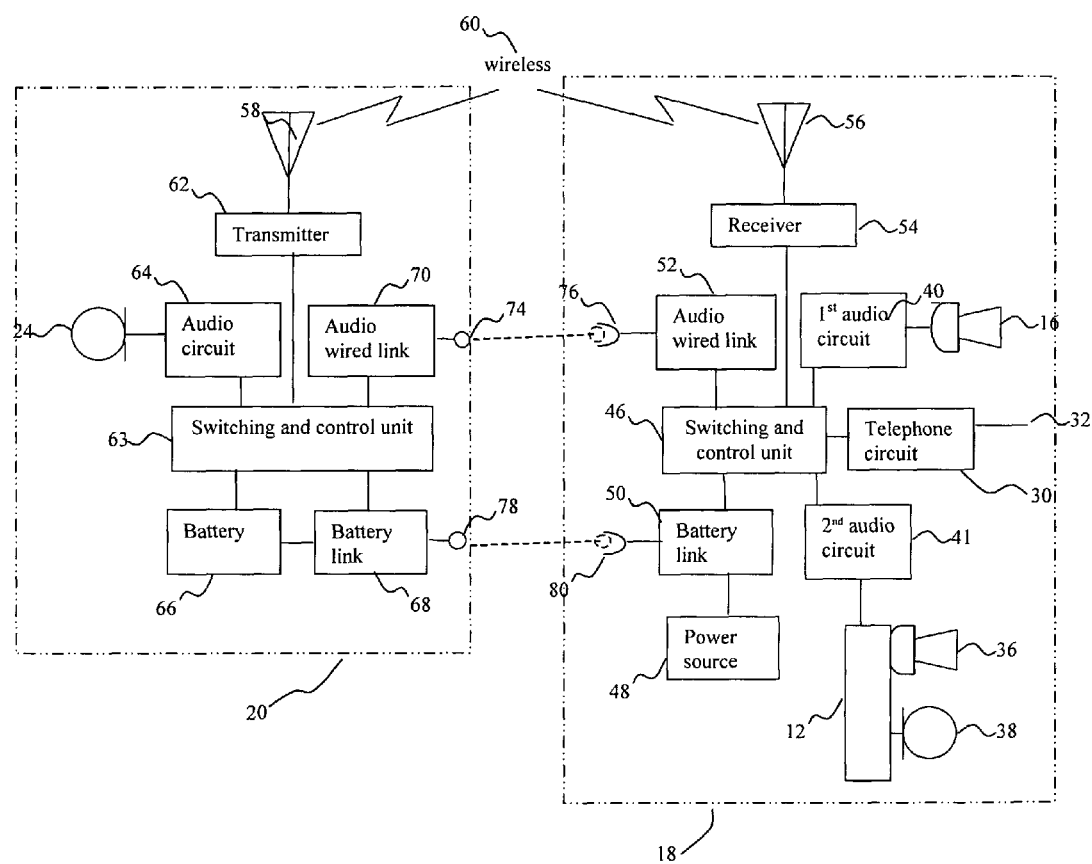
FIG. 2 is a schematic diagram showing functional elements of the speakerphone with a removable microphone pod.

FIG. 2 shows a schematic diagram of the principal functional elements of the speakerphone with detachable wired/wireless microphone pod of this invention. The speakerphone base unit 18 contains at least one well-known telephone network interface circuit 30, which may be any suitable telephone interface including, but not limited to analogue, digital, packet or internet protocol interfaces, connected to a telephone network (not shown) by a connection 32. The connection to the network itself may be wired or wireless. The telephone network interface 30 is switchably attached via switching and control unit 46 to the other base station 18 circuitry as required. The switching and control unit may consist of, but is not limited to, a microprocessor and associated software. Included in the base station 18 is a first auditory circuit 40, capable of driving or transmitting appropriate strength signals to drive base station loudspeaker 16. There is also a second auditory circuit 41, capable of processing signals for handset 12's earpiece loudspeaker 36 and from earpiece microphone 38. Either of the auditory circuits 40 and 41 may also process incoming auditory signals received from microphone pod 20's microphone 24, relayed either wirelessly via receiver 54 or via the audio wired link 52.

The receiver 54, capable of being activated by control unit 46 to receive wireless signals may for instance be, but is not limited to, the receiving portion of the well known Bluetooth system, described in detail in for instance, U.S. Pat. No. 6,255,800 to Bork entitled "Bluetooth enabled mobile device charging cradle and system", the contents of which are hereby incorporated by reference or of the well known IEEE 802.11 "Wi-Fi" system implementation or the receiving portion of a fiber-less optical transmission system as described in, for instance, U.S. Pat. No. 5,566,022 to Sergev, entitled "Infrared communication system", the contents of which are hereby incorporated by reference. The Bluetooth wireless specification includes both link layer and application layer definitions. Radios that comply with the Bluetooth wireless specification operate in the unlicensed, 2.4 GHz radio spectrum using a spread spectrum, frequency hopping, full-duplex signal at up to 1600 hops/sec. The Bluetooth signal hops among 79 frequencies at 1 MHz intervals to give a high degree of interference immunity. Wi-Fi is a term of art for the IEEE 802.11a and 802.11b wireless transmission specifications. The 802.11b specification allows for the wireless transmission of approximately 11 Mbps of raw data at indoor distances from several dozen to several hundred feet and outdoor distances of several to tens of miles as an unlicensed use of the 2.4 GHz band. The 802.11a specification uses the 5 GHz band, and can handle 54 Mbps at typically shorter distances. Wi-Fi is an extension of wired Ethernet, bringing the same principles to wireless communication, and as such is ecumenical about the kinds of data that pass over it. Primarily used for TCP/IP, Wi-Fi can also handle other forms of networking traffic, such as AppleTalk or PC files sharing standards.

Base station 18's control unit 46 may for instance be a suitable microprocessor, associated software and circuitry to enable functions such as, but not limited to, in-cradle and out-of-cradle detection, dial-tone and pulse generation, echo canceling and suppression, circuit selection as well as switching signals to or from appropriate circuits or components, such as but not limited to, appropriate microphones or loudspeakers and their associated drivers. Base station 18 also contains a suitable power source or link 48, which may include, but is not limited to, a connection to suitably transformed electrical power. Other base station 18 equipment includes, but is not limited to, a battery link 50 with suitable battery connector 80, an audio wired link circuit 52 with suitable connector 76 and an antenna or beam shaping device 56 suitable for receiving electromagnetic signals of the wavelengths used for the wireless link 60.

Microphone pod 20 has an antenna or transmission beam-shaping component 58 suitable for transmitting electro-magnetic signals of the wavelengths used to establish the wireless link 60. Antenna or transmission beam shaping component 58 is connected to a transmitter 62 that in turn is connected to pod switching and control unit 63. Transmitter 62 may for instance be, but is not limited to, the transmitting portion of the well-known Bluetooth system or of the well-known Wi-Fi system implementation or a fiber-less optical transmission.

Pod switching and control unit 63 may for instance be, but is not limited to, a suitable microprocessor and associated software. Pod 20 also includes at least one microphone 24, a rechargeable battery 66, with a battery link 68 having connector 78 suitable for direct attachment to base station 18's battery link connector 80. Microphone pod 20 also has an audio wired link 70 having a connector 74, suitable for direct attachment to base station 18's audio wired link connector 76.

The speakerphone of the preferred embodiment is capable of operating in at least three distinct modes.

In a first mode of operation of the speakerphone of this invention, the user lifts the handset 12 off the hook. In this mode, the base station switching and control unit 46 detects the off-hook signal and enables the user to use the handset 12's mouthpiece microphone 38 and earpiece loudspeaker 36 in the usual fashion. In this first mode of operation the user or local talker or near party speaks into the mouthpiece or handset microphone 38 and hears the distant party on the earpiece or handset loudspeaker 36. In this mode of operation base station 18's microphone 16 is muted or receives no input. Similarly microphone pod 20's microphone 24 is muted or no signal from it is processed for auditory purposes. Base station 18's $2^{nd}$ auditory circuitry 41 is used to transfer voice signals to and from the telephone network interface 30 by base station switching and control unit 46. From telephone network interface 30, the signals are relayed over connection 32 to the telephone network and on to the far talker (not shown).

In a second mode of operation of the speakerphone of this invention, the speakerphone operates in a manner similar to a conventional speakerphone. In this mode the handset 12 is left on, or replaced onto, the hook, the microphone pod 20 is attached to the base station 18 and a speakerphone mode is activated by the local or near user by, for instance, but not limited to, pressing an appropriate function button on keypad 14. In this second mode of operation, handset 12's mouthpiece microphone 38 and earpiece loudspeaker 36 are now muted. The far party audio signal is transmitted over base station 18's loudspeaker 16, allowing everyone in the room to hear the far party audio. The term "the far party" is used synonymously with the term "the far talker" in this application to mean the person or persons not in the same room as the speakerphone and participating in the telephone conversation via a telephone or other network link. Near party audio input is picked up by pod 20's microphone 24. The term "near party" is used synonymously with the term "near talker" in this application to mean the person or persons in the same room as the speakerphone. In this conventional speakerphone mode of operation, microphone pod 20's connector 74 is physically in contact with base station 18's connector 76, as shown by the dotted line in FIG. 2. In this wired mode of operation, RF link 60 is inactive or bypassed and the audio signal from active microphone 24 passes through audio wired link 70 to base station 18's audio wired link 52 and on to telephone network interface 30. Additionally, in this wired mode of operation, battery link 68's connector 78 is directly attached to base station 18's battery connector 80. This allows rechargeable battery 66 to be recharged from base station power source 48.

In the third mode of operation, the speakerphone of this invention is in a low-echo, wireless mode in which handset 12 is on hook, speakerphone mode is activated by user selection and microphone pod 20 is detached from base station 18. Connectors 74 and 76 are no longer in physical connection, nor are connectors 78 and 80. However, microphone 24 is still the active microphone, picking up near-talker audio. The audio signal, in appropriately encoded form is transmitted by transmitter 62 using antenna or beam shaping module 58 to base station antenna or beam shaping module 56 and receiver 54. Receiver 54 appropriately decodes the received signal and feeds that decoded signal on to telephone network interface 30, under the control of switching and control unit 46.

This third mode of operation allows the microphone 24 in the microphone pod 20 to be placed in the optimal position for a given circumstance. For instance, when two or more people are using a single speakerphone, the wireless microphone 24 can be placed at the center point of the group. By having the microphone 24 close to one or more speaking people, the voice quality of the transmitted speech is improved. Voice quality is improved in two ways. First, because the microphone is closer to any single talker's mouth, the speech-signal-to-room-noise ratio is increased. Second, and again because the microphone is closer to the mouth, the speech signal arriving at the microphone is less reverberant, that is less 'hollow' or 'barrel' sounding.

In this third mode of operation, the microphone pod 20 may be moved from talker to talker, thereby ensuring improved speech quality.

In a further embodiment of the invention, the speakerphone may include multiple microphone pods 20.

In a further embodiment of the invention the wireless link 60 may operate in duplex mode, with both the microphone pod 20 and the base station 18 each having both a wireless transmitter and a wireless receiver. In this mode audio and control signals may be sent from the microphone pod 20 to the base station 18, while control and command signals are sent from the base station 18 to the microphone pod 20.

In a further embodiment of the invention, the microphone pod 20 signals the base station 18 that it has been removed so the speakerphone can adjust appropriate algorithms including, but not limited to, making adjustments to improve the duplexness of speech communications by exploiting the reduced acoustic coupling between microphone and loudspeaker.

In a further embodiment of the invention, the speakerphone may include multiple microphone pods 20, with the pods having means for both transmitting and receiving signals. In addition the base station 18 may have means for both transmitting and receiving signals. In such an embodiment, the multiple microphones 24 could be synchronized or coordinated, either by signals sent from other microphone pods 20 or from signals sent from the base station 18, so that only one microphone is active at any specific time. Methods of deciding the location of the active near talker include, but are not limited to, comparing the amplitude, frequency content, and phase of the signals picked up from the various microphones as described in detail in for instance, U.S. Pat. No. 6,219,645 to Byers entitled "Enhanced automatic speech recognition using multiple directional microphones", the contents of which are hereby incorporated by reference.

In a further embodiment base-station 18 may have means for measuring the acoustic coupling between the base-station loudspeaker and the microphones in each of the microphone pods. This acoustic coupling decreases quite regularly with increasing distance and may be used in echo canceling and suppression circuits and algorithms, which are well known in the speakerphone art. The strength of the acoustic coupling is a better indicator of the relative position of loudspeaker and microphone than the strength of the wireless transmission from pod to base-station, as radio frequency (RF) signal strength tends to vary chaotically within a room or structure because of reflective surfaces and may change appreciably for small changes between receiver and transmitter.

While the invention has been described with the wireless link as a radio-frequency link, one of skill in the art will appreciate that the wireless link could operate at any suitable frequency of electromagnetic radiation, including but not limited to optical, infra-red and ultra-violet wavelengths, as well as non-audible acoustic links, such as ultra-sound. When optical wavelengths of electro-magnetic radiation are used, the antenna 56 and 58 will take the form of suitable transmitting and receiving optical devices, including lenses, mirrors and diffraction gratings.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A desktop speakerphone, comprising:
   a telephone base-station, said base station including a wireless receiver, a base-station loudspeaker, a base-station communications connector, a first switching and control unit and a telephone network interface, and wherein an incoming audio signal received via said telephone network interface is capable of being transmitted over said base-station loudspeaker; and
   a microphone pod, said pod being removably attached to said base-station and including at least one microphone, a pod communications connector, a second switching and control unit and a wireless transmitter;
   and wherein when said base-station connector is not physically connected to said pod connector, said first and second switching and control units send an outgoing audio signal produced by said microphone as a wireless transmission from said wireless transmitter to said wireless receiver of said base-station and then on to said telephone network interface and, when said base-station communications connector is physically connected to said pod communications connector, said first and second control units send said outgoing audio signal produced by said microphone as a wired transmission from said pod communications connector to said base-station communications connector and then on to said telephone network interface.

2. The speakerphone of claim 1 wherein said microphone pod further includes a rechargeable battery and a pod battery connector; and wherein said base-station further includes a base-station battery connector and a battery recharging power source, such that when said pod is attached to said base-station, said pod battery connector is in contact with said base-station battery connector, and said pod rechargeable battery is recharged by said battery recharging power source.

3. The speakerphone of claim 1 wherein said wireless transmission conforms to BlueTooth specifications.

4. The speakerphone of claim 1 wherein said wireless transmission conforms to a specification chosen from the group consisting of IEEE 801.a specification, IEEE 801.b specification and a fiber-less optical transmission specification.

5. The speakerphone of claim 1, wherein said microphone pod is a first microphone pod, and further including at least a second microphone pod, removeably connected to said base-station.

6. The speakerphone of claim 1 wherein said base-station further includes a control circuit capable of monitoring an acoustic coupling strength between said microphone and said base-station loudspeaker; and an echo canceling and suppression circuit capable of using said acoustic coupling strength as an estimate of the distance between said base-station loudspeaker and said microphone.

7. The speakerphone of claim 1 including another microphone pod, said another microphone pod being removably attached to said base-station and including at least one microphone, a pod communications connector, a second switching and control unit and a wireless transmitter.

8. The desktop speakerphone of claim 1, wherein the telephone base-station includes a handset separate from said microphone pod.

9. The desktop speakerphone of claim 1, wherein the desktop speakerphone comprises a landline.

10. A desktop speakerphone method, comprising:
    providing a telephone base-station including a wireless receiver, a base-station loudspeaker, a base-station communications connector, a first switching and control unit and a telephone network interface;
    providing a microphone pod including at least one microphone, a pod communications connector, a second switching and control unit and a wireless transmitter;
    connecting the pod communications connector to the base-station communications connector to form a wired transmission path from the microphone to the base station;
    receiving an incoming audio signal via said telephone network interface;
    enabling said incoming audio signal to be transmitted over said base station loudspeaker;
    generating a first outgoing audio signal using said microphone while said microphone is connectably attached to said base-station;
    said first and second switching and control units causing routing said first outgoing audio signal via said wired transmission path to said base-station communications connector and then on to said telephone network interface;
    removing said microphone pod from said base-station;
    generating a second outgoing audio signal using said microphone;
    wirelessly transmitting said second outgoing audio signal from said wireless transmitter to said wireless receiver; and
    sending said second outgoing audio signal out using said telephone network interface.

11. The method of claim 10, wherein said microphone pod further includes a rechargeable battery and a pod battery connector; and wherein said base-station further includes a base-station battery connector and a battery recharging power source; and wherein when said microphone pod is attached to said base-station the method includes:
    charging said rechargeable battery using said battery recharging power source, via said pod battery connector and said base-station battery connector.

12. The method of claim 10, wherein said step i) of wirelessly transmitting includes a wireless transmission conforming to a transmission specification chosen from the group consisting of BlueTooth specification, IEEE 802.11a specification, IEEE 802.11b specification and a fiber-less optical transmission specification.

13. The method of claim 10, wherein said microphone pod is a first microphone pod, and further including at least a second microphone pod, removeably connected to said base-station.

14. The method of claim 10, further including:
determining a measurement of acoustic coupling strength between said microphone and said base-station loudspeaker; and
using said measurement of acoustic coupling strength in an echo canceling and suppression algorithm.

15. The method of claim 10 including:
providing another microphone pod including at least one microphone, a pod communications connector, a second switching and control unit and a wireless transmitter;
connecting the another microphone pod communications connector to the base-station communications connector to form a wired transmission path from the another microphone pod to the base station;
removing the another microphone pod from said base-station;
generating a third outgoing audio signal using the microphone of the another microphone pod;
wirelessly transmitting the third outgoing audio signal from the wireless transmitter to the wireless receiver; and
sending said third outgoing audio signal out using the telephone network interface.

16. The desktop speakerphone method of claim 10, wherein providing a telephone base station comprises providing a telephone base station having a handset separate from said microphone pod.

17. A desktop speakerphone apparatus, comprising:
a telephone base-station including means for receiving an incoming audio signal from a telephone network; loudspeaker means for making said incoming audio signal audible; means for wirelessly receiving an outgoing audio signal, base-station communication connector means for wired reception of said outgoing audio signal, a first switching and control means for selection between wireless or wired reception of said outgoing audio signal; and dispatching means for dispatching said outgoing audio signal to said telephone network;
a microphone pod removably attached to said telephone base-station and including microphone means for converting audible sound into said outgoing audio signal, pod communication connection means for wired transmission of said outgoing audio signal, wireless means for wirelessly transmitting said outgoing audio signal, and a second switching and control means for selecting between wired and wireless transmission of said outgoing audio signal.

18. The desktop speakerphone apparatus of claim 17, wherein said microphone pod further includes a rechargeable battery; and wherein said base-station further includes a battery recharging means for recharging batteries; and wherein said base-station further includes battery connector means for connecting said recharging means to said rechargeable battery.

19. The desktop speakerphone apparatus of claim 17, wherein said wireless means for wirelessly transmitting conforms to a specification chosen from the group consisting of BlueTooth specification, IEEE 802.11a specification, IEEE 802.11b specification and a fiber-less optical transmission specification.

20. The desktop speakerphone apparatus of claim 17, wherein said microphone pod is a first microphone pod, and further including at least a second microphone pod, removeably connected to said base-station.

21. The desktop speakerphone apparatus of claim 17, further including means for determining a measurement of acoustic coupling strength between said microphone means and said loudspeaker means; and suppression means, capable of using said measurement of acoustic coupling strength, for echo canceling and suppression.

22. The desktop speakerphone apparatus of claim 17, including another microphone pod, said another microphone pod being removably attached to said base-station and including at least one microphone, a pod communications connector, a second switching and control unit and a wireless transmitter.

23. The desktop speakerphone apparatus of claim 17, wherein the telephone base-station includes a handset separate from said microphone pod.

24. The desktop speakerphone of claim 17, wherein the desktop speakerphone is a landline.

* * * * *